(12) United States Patent
Detwiler

(10) Patent No.: US 7,992,785 B2
(45) Date of Patent: Aug. 9, 2011

(54) MIRRORED SPINNER WITH PAIRED OFFSET FACETS

(75) Inventor: Paul O. Detwiler, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 462 days.

(21) Appl. No.: 11/426,324

(22) Filed: Jun. 26, 2006

(65) Prior Publication Data

US 2007/0295816 A1 Dec. 27, 2007

(51) Int. Cl.
*G02B 26/00* (2006.01)
*G02B 26/12* (2006.01)

(52) U.S. Cl. .................. 235/462.4; 359/216.1

(58) Field of Classification Search .......... 359/216–219; 235/462.38–462.4
See application file for complete search history.

(56) References Cited

U.S. PATENT DOCUMENTS

| 4,003,627 | A | * | 1/1977 | Wu et al. .................. 359/219.1 |
| 4,018,504 | A |  | 4/1977 | Wu et al. |
| 4,413,878 | A | * | 11/1983 | Lettington .................. 359/203 |
| 5,000,529 | A | * | 3/1991 | Katoh et al. .................. 359/216 |
| 5,484,990 | A |  | 1/1996 | Lindacher et al. |
| 6,104,524 | A |  | 8/2000 | Hisano et al. |
| 6,237,851 | B1 |  | 5/2001 | Detwiler |
| 6,693,723 | B2 |  | 2/2004 | Keithley et al. |
| 7,304,779 | B2 | * | 12/2007 | Guldevall .................. 359/216.1 |
| 2003/0201326 | A1 |  | 10/2003 | Bobba et al. |

FOREIGN PATENT DOCUMENTS

WO   WO 83/01718 A1   5/1983

* cited by examiner

*Primary Examiner* — Jamara A Franklin
(74) *Attorney, Agent, or Firm* — Paul W. Martin; Peter H. Priest; Harden E. Stevens, III

(57) ABSTRACT

A mirrored spinner with paired offset facets for scattering a laser beam. The mirrored spinner includes a first number of mirrored facets, including a second number of pairs of offset mirrored facets.

20 Claims, 3 Drawing Sheets

MIRRORED SPINNER WITH PAIRED OFFSET FACETS

BACKGROUND OF THE INVENTION

The present invention relates to optical scanners and more specifically to a mirrored spinner with paired offset facets.

Typical bar code scanners use mirrored spinners to scan an incident laser beam into a series of ray fans. These fans, when projected onto a plane, produce a series of approximately straight curves (scan lines). Typically, the several facets of a mirrored spinner are inclined at different angles, so as to produce a set of spaced apart parallel lines. The length of these lines is proportional to the tangent of the facet scan angle and the distance between the spinner and the projection plane. Conventional spinners are regular polygons and produce sets of equal length scan lines.

In scanners incorporating conventional spinners for producing parallel horizontal scan lines for scanning vertically oriented bars and spaces and parallel vertical scan lines for scanning horizontally oriented bars and spaces, some of the vertical scan lines are redundant and wasted. The vertical lines fill the scan volume by their length, and do not require as much repetition.

Therefore, it would be desirable to provide a mirrored spinner with paired offset facets.

SUMMARY OF THE INVENTION

A mirrored spinner with paired offset facets is provided.

A mirrored spinner with paired offset facets for scattering a laser beam. The mirrored spinner includes a first number of mirrored facets, including a second number of pairs of offset mirrored facets.

DETAILED DESCRIPTION

Figure 1:
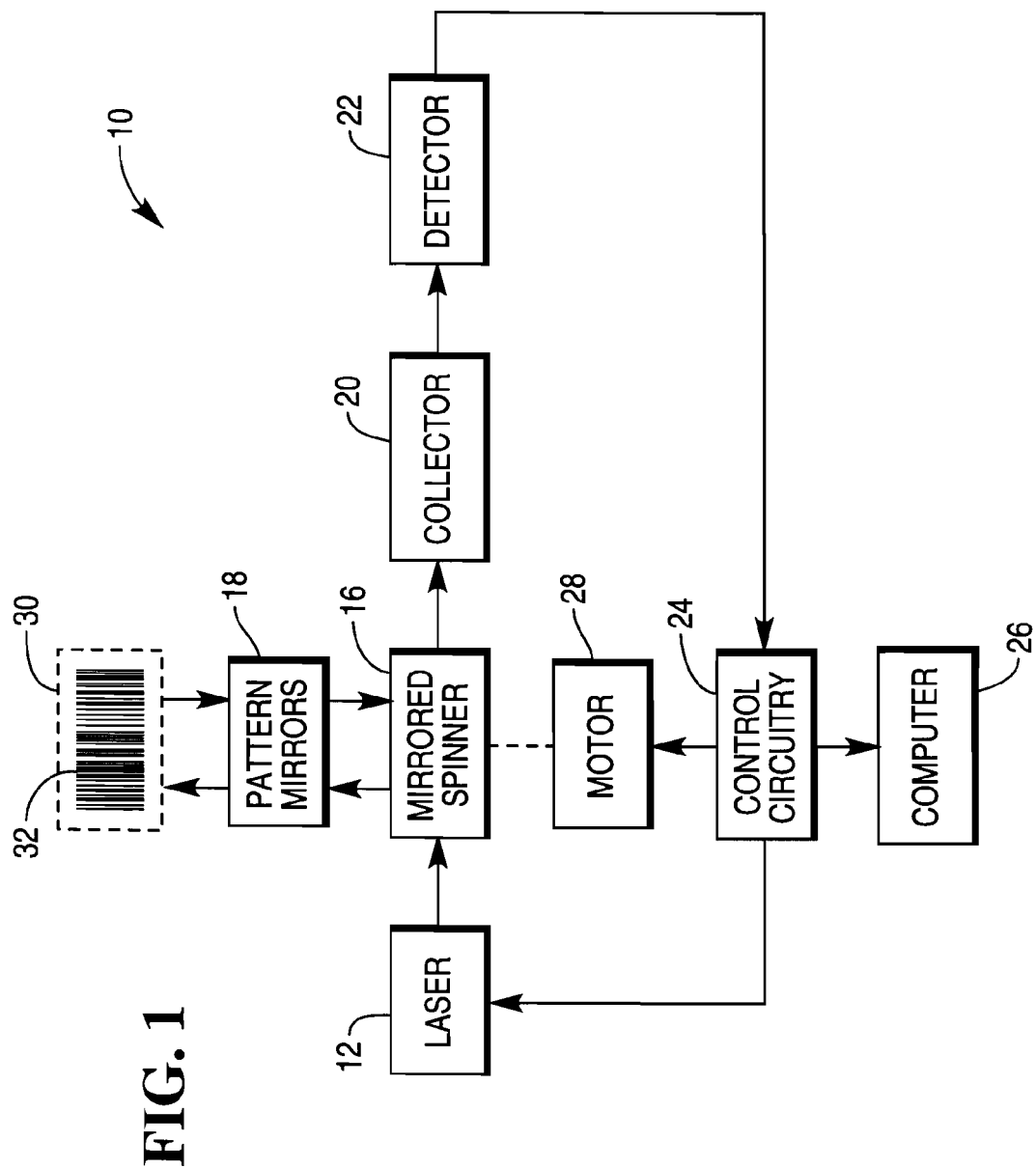
FIG. 1 is a block diagram of an example optical scanner.

With reference to FIG. 1, an example bar code scanner 10 includes laser 12, mirrored spinner 16, pattern mirrors 18, collector 20, detector 22, and control circuitry 24. Laser 12 produces a laser beam.

Mirrored spinner 16 directs the laser beam to pattern mirrors 18. Mirrored spinner 16 further directs light reflected from item 30 to collector 20. Motor 28 rotates mirrored spinner 16.

Pattern mirrors 18 produce scanning light beams for scanning bar code 32 on item 30. Pattern mirrors 18 further collect light reflected from item 30 and direct the reflected light to mirrored spinner 16.

Collector 20 collects the reflected light from mirrored spinner 16.

Detector 22 converts the reflected light into electrical signals based upon the intensity of the reflected light.

Control circuitry 24 controls operation of laser 12 and motor 28 and decodes bar code information contained within the electrical signals received from detector 22. Control circuitry 24 sends decoded bar code information to a computer 26, such as a retail terminal.

Figure 2:
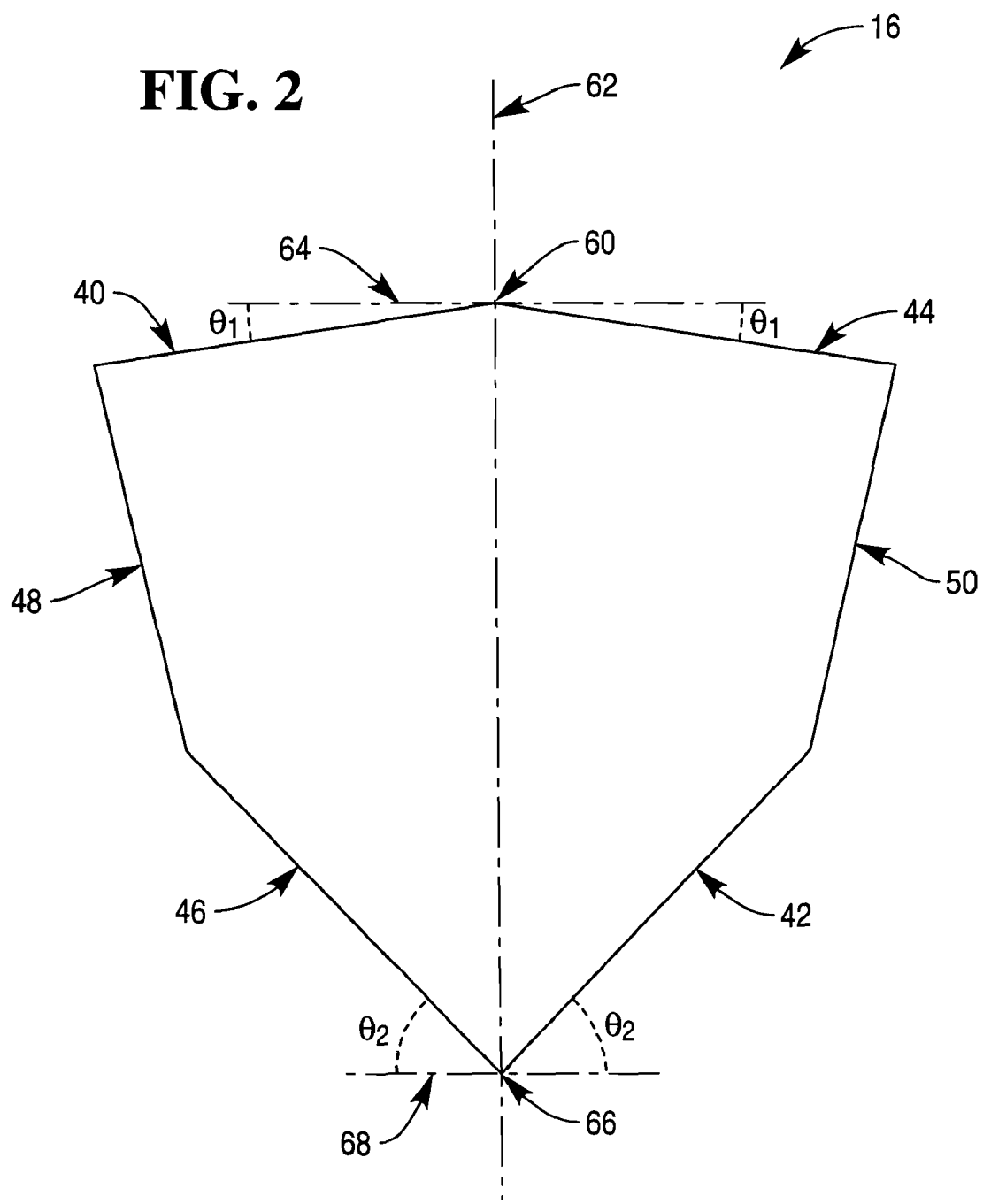
FIG. 2 is a schematic of an example mirrored spinner with paired offset facets.

Referring to FIG. 2, an example mirrored spinner 16 is illustrated in detail. Example mirrored spinner 16 includes six mirrored facets 40-50. Four or more mirrored facets are envisioned.

Example mirrored spinner 16 includes two pairs of offset mirrored facets, 40, 42 and 44, 46. The offset nature of the facets in this example is defined relative to a polygon spinner with six equal sides. Facets 40 and 44 are oriented at a vertex angle $\theta_1$ from a line 64 through vertex 60 and normal to centerline 62. Facets 42 and 46 are oriented at vertex angle $\theta_2$ from a line 68 through vertex 66 and normal to centerline 62.

Any method of determining offset that produces different vertex angles $\theta_1$ and $\theta_2$ is envisioned. One example way of determining offset is to define an offset angle $\Delta$, and substract it from one pair of facet angles and add it to another pair of facet angles.

For example, in a polygon spinner with six equal sides, all six sides have the same vertex angle of 30°. Vertex angle $\theta_1$ equals 30°−$\Delta$, and vertex angle $\theta_2$ equals 30°+$\Delta$. In the illustrated example, offset angle $\Delta$ is about 15°. Therefore, vertex angle $\theta_1$ is about 15°, and vertex angle $\theta_2$ is about 45°.

Facets 48 and 50 link the pairs of offset facets together. Facet 48 link facet 40 to facet 46. Facet 50 links facet 44 to facet 42.

Figure 3:
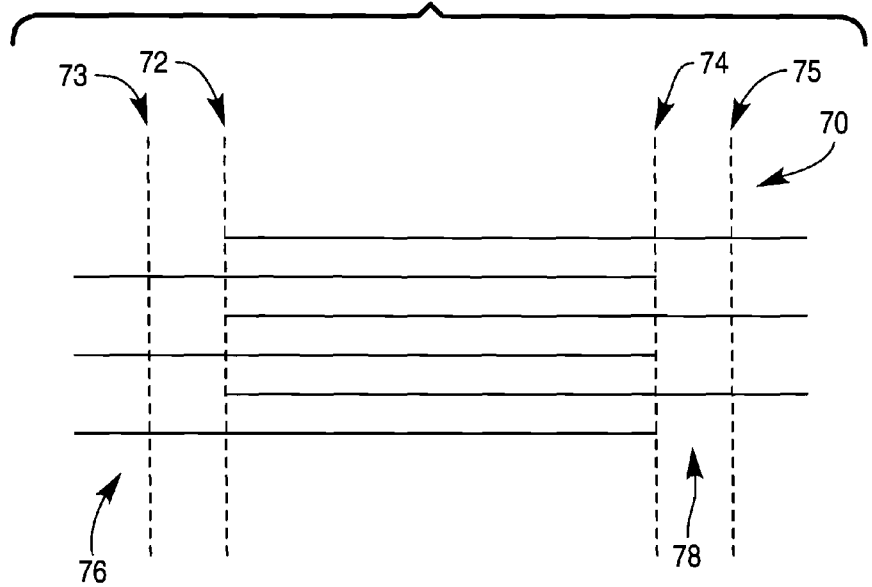
FIG. 3 illustrates the difference between conventional scan lines and example scan lines produced using the example mirrored spinner.

With reference to FIG. 3, offset mirrored facets 40, 42 and 44, 46 produce a set of scanning beams 70. Relative to scanning beams produced by a conventional mirrored spinner with substantially equal facet angles, whose scanning beams extend from reference line 72 to reference line 74, mirrored spinner 16 produces scanning beams 70 that are each shortened on one end and extended on an opposite end.

Mirrored facets 40, 46, and 50 contribute to production of scanning beams 78. Mirrored facets 42, 44, and 48 contribute to production of scanning beams 76. Scanning beams 76 and 78 may be interlaced or not.

Mirrored spinner directs scanning beams 70 towards pattern mirrors 18, which use portions of scanning beams 70 to produce scan lines 80. In this example, the portions are defined by reference lines 72, 73, 74, and 75.

Figure 4:
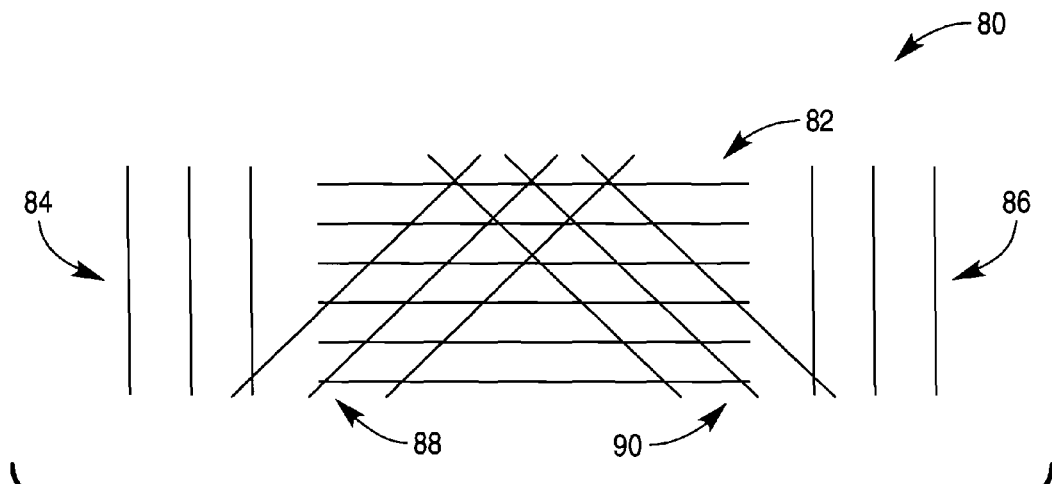
FIG. 4 illustrates an example scan pattern produced using the example mirrored spinner.

With reference to FIG. 4, an example scan pattern 80 is illustrated that is based upon use of mirrored spinner 16. Using an arbitrary arrangement of pattern mirrors 18, scan pattern 80 includes six horizontal scan lines 82 from the portion of scanning beams 70 between reference lines 72 and 74. Mirrored facets 40-50 all contribute to production of horizontal scan lines 82.

Scan pattern 80 further includes three left vertical scan lines 84 and three right vertical scan lines 86. Left vertical scan lines 84 use the portion of scanning beams 70 left of reference line 73. Mirrored facets 42, 44, and 48 contribute to production of left vertical scan lines 84.

Right vertical scan lines 86 use the portion of scanning beams 70 right of reference line 75. Mirrored facets 40, 46, and 50 contribute to production of right vertical scan lines 86.

Use of spinner 16 reduces the number of vertical scan lines on each side from six, as with a conventional spinner, to three. However, spinner 16 makes left and right vertical scan lines 84 and 86 longer than the vertical scan lines produced by a conventional spinner. Therefore, fewer vertical scan lines are required.

Advantageously, use of spinner 16 provides flexibility in pattern design. For many barcode scanner applications, generating fewer but longer vertical scan lines and generating additional scan lines in the center of the scan pattern results in a far superior scan pattern. To this end, additional pattern mirrors 18 may be added in order to devote laser power that would otherwise be used by a conventional spinner to generate six left and six right vertical scan lines to generate additional scan lines in the center of scan pattern 80.

Example scan pattern 80 further includes three left and three right diagonal scan lines 88 and 90. Use of spinner 16 makes left and right diagonal scan lines 88 and 90 longer than the diagonal scan lines produced by a conventional spinner.

Left diagonal scan lines 80 use the portion of scanning beams 70 between reference lines 72 and 73. Mirrored facets 42, 44, and 48 contribute to production of left diagonal scan lines 88.

Right diagonal scan lines 80 use the portion of scanning beams 70 between reference lines 74 and 75. Mirrored facets 40, 46, and 50 contribute to production of right diagonal scan lines 90.

Although particular reference has been made to certain embodiments, variations and modifications are also envisioned within the spirit and scope of the following claims.

What is claimed is:

1. A spinner for scattering a laser beam comprising:
a mirrored polygon having a centerline, the mirrored polygon including a first number of mirrored facets defining vertices of the polygon where the centerline passes through a first vertex and a second vertex, the first number of mirrored facets including a second number of pairs of offset mirrored facets, wherein the mirrored facets of the pairs of offset mirrored facets are oriented at different vertex angles, at least a first vertex angle defined by a first line passing through the first vertex and perpendicular to the centerline and a first mirrored facet having the first vertex as a vertex, and at least a second vertex angle defined by a second line passing through the second vertex and perpendicular to the centerline and a second mirrored facet having the second vertex as a vertex;
wherein a first supplementary angle of the first vertex angle is greater than an interior angle of a regular polygon having a same number of facets and a second supplementary angle of the second vertex angle is less than the interior angle of the regular polygon with the same number of facets.

2. The spinner of claim 1, wherein the first number comprises at least four.

3. The spinner of claim 1, wherein the first number comprises six.

4. The spinner of claim 3, wherein the first and second vertex angles are determined by subtracting and adding an offset angle from a regular polygon vertex angle.

5. The spinner of claim 4, wherein the offset angle comprises about 15°.

6. The spinner of claim 1, wherein the second number comprises two.

7. The spinner of claim 1 further comprising linking facets to link the pairs of offset facets.

8. A spinner for scattering a laser beam comprising:
a mirrored polygon having a centerline, the mirrored polygon including a number of mirrored facets defining vertices of the polygon where the centerline passes through a first vertex and a second vertex, the mirrored facets including
a first pair of adjoining mirrored facets each having a first vertex angle defined by a first line passing through the first vertex and perpendicular to the centerline and one mirrored facet of the first pair of adjoining mirrored facets where the first pair of adjoining mirrored facets have the first vertex as a common vertex; and
a second pair of adjoining mirrored facets each having a second vertex angle defined by a second line passing through the second vertex and perpendicular to the centerline and one mirrored facet of the second pair of adjoining facets where the second pair of adjoining mirrored facets have the second vertex as a common vertex;
wherein a first supplementary angle of the first vertex angle is greater than an interior angle of a regular polygon having a same number of facets and a second supplementary angle of the second vertex angle is less than the interior angle of the regular polygon with the same number of facets.

9. The spinner of claim 8, wherein the first vertex angle is determined by subtracting an offset angle from a regular polygon vertex angle, and wherein the second vertex angle is determined by adding the offset angle to the regular polygon vertex angle.

10. The spinner of claim 8, wherein the first and second pairs of adjoining mirrored facets produce scanning beams that are shortened on one end and extended on an opposite end.

11. The spinner of claim 10, wherein a first group of alternating mirrored facets produce a first set of scanning beams that are shortened on a right end and extended on a left end, and wherein a second group of alternating mirrored facets produce a second set of scanning beams that are shortened on a left end and extended on a right end.

12. The spinner of claim 11, wherein the first and second sets of scanning beams are interlaced.

13. The spinner of claim 8 further comprising linking facets to link the pairs of offset facets.

14. A barcode scanner comprising:
a laser for creating a laser beam;
a mirrored polygon having a centerline, the mirrored polygon for producing scanning beams from the laser beam including a number of mirrored facets defining vertices of the polygon where the centerline passes through a first vertex and a second vertex, the mirrored facets including
a first pair of adjoining mirrored facets each having a first vertex angle defined by a first line passing through the first vertex and perpendicular to the centerline and one mirrored facet of the first pair of adjoining mirrored facets where the first pair of adjoining mirrored facets have the first vertex as a common vertex; and
a second pair of adjoining mirrored facets each having a second vertex angle different from the first vertex angle and defined by a second line passing through the second vertex and perpendicular to the centerline and one mirrored facet of the second pair of adjoining facets where the second pair of adjoining mirrored facets have the second vertex as a common vertex;
wherein a first supplementary angle of the first vertex angle is greater than an interior angle of a regular polygon having a same number of facets and a second supplementary angle of the second vertex angle is less than the interior angle of the regular polygon with the same number of facets; and
a plurality of pattern mirrors for producing scan lines from the scanning beams.

15. The scanner of claim 14, wherein the scanning beams are shortened on one end and extended on an opposite end.

16. The scanner of claim 15, wherein the spinner comprises six mirrored facets.

17. The scanner of claim 16, wherein the pattern mirrors divide the scanning beams into six horizontal scan lines, three left vertical scan lines, three right vertical scan lines, three left diagonal scan lines, and three right diagonal scan lines.

18. The barcode scanner of claim 14 wherein the mirrored polygon further comprises linking facets to link the pairs of offset facets.

19. A barcode scanner comprising:
   a laser for creating a laser beam;
   a mirrored polygon having a centerline, the mirrored polygon for producing scanning beams from the laser beam including a first number of mirrored facets defining vertices of the polygon where the centerline passes through a first vertex and a second vertex, wherein the first number of mirrored facets include a second number of pairs of offset mirrored facets, wherein the mirrored facets of the pairs of offset mirrored facets are oriented at different vertex angles, at least a first vertex angle defined by a first line passing through the first vertex and perpendicular to the centerline and a first mirrored facet, and at least a second vertex angle defined by a second line passing through the second vertex and perpendicular to the centerline and a second mirrored facet;
   wherein a first supplementary angle of the first vertex angle is greater than an interior angle of a regular polygon having a same number of facets and a second supplementary angle of the second vertex angle is less than the interior angle of the regular polygon with the same number of facets; and
   a plurality of pattern mirrors for producing scan lines from the scanning beams.

20. The barcode scanner of claim 19 wherein the mirrored polygon further comprises linking facets to link the pairs of offset facets.

\* \* \* \* \*